(12) United States Patent
Planson et al.

(10) Patent No.: US 11,390,203 B2
(45) Date of Patent: Jul. 19, 2022

(54) ARMREST ASSEMBLY FOR VEHICLE SEAT

(71) Applicant: FAURECIA Sièges d'Automobile, Nanterre (FR)

(72) Inventors: Jérôme Planson, Angerville (FR); Olivier Rigal, Etampes (FR); Thierry Senges, Saint-Chéron (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 16/883,187

(22) Filed: May 26, 2020

(65) Prior Publication Data

US 2020/0376996 A1 Dec. 3, 2020

(30) Foreign Application Priority Data

May 27, 2019 (FR) ...................... 19 05604

(51) Int. Cl.
*B60N 2/75* (2018.01)
*B60N 2/90* (2018.01)

(52) U.S. Cl.
CPC ............... *B60N 2/77* (2018.02); *B60N 2/933* (2018.02); *B60N 2002/952* (2018.02)

(58) Field of Classification Search
None
See application file for complete search history.

(56) References Cited

U.S. PATENT DOCUMENTS

| | | | | | |
|---|---|---|---|---|---|
| 4,951,995 A | * | 8/1990 | Teppo | .................. | A47C 1/0305 297/411.36 |
| 5,795,026 A | * | 8/1998 | Dral | .......................... | A47C 1/03 297/411.2 |
| 5,829,839 A | * | 11/1998 | Wilkerson | ............... | A47C 1/03 297/411.36 |
| 6,132,001 A | * | 10/2000 | Su | ........................ | A47C 1/0305 297/411.36 |
| 6,464,298 B1 | * | 10/2002 | Hansel | ................. | B60N 2/0705 297/366 |

(Continued)

FOREIGN PATENT DOCUMENTS

| CN | 206367409 U | 8/2017 |
|---|---|---|
| DE | 10218568 A1 | 11/2003 |

(Continued)

OTHER PUBLICATIONS

French Search Report for FR 19 05604 dated Feb. 2, 2020, BET 200139, 12 pages, (No English Translation available).

(Continued)

*Primary Examiner* — David E Allred
(74) *Attorney, Agent, or Firm* — Barnes & Thornburg LLP

(57) ABSTRACT

An armrest assembly for a vehicle seat, the assembly comprising an armrest, a support, and an intermediate portion, the armrest being movable in translation along a vertical direction relative to the support, the assembly further comprising a locking device for the armrest comprising: a first part having toothed elements, and a second part capable of coming into contact with the toothed elements of the first part, and wherein the second part is movable between a locking position in which the second part is in contact with the toothed elements of the first part and an unlocking position allowing movement in translation along the vertical direction of the armrest.

12 Claims, 7 Drawing Sheets

(56) References Cited

U.S. PATENT DOCUMENTS

| | | | | |
|---|---|---|---|---|
| 6,533,355 | B2* | 3/2003 | Broekhuis | A47C 3/265 |
| | | | | 297/353 |
| 7,434,887 | B1* | 10/2008 | Hsien | A47C 1/0303 |
| | | | | 297/411.36 |
| 8,845,021 | B2* | 9/2014 | Hou | B60N 2/2872 |
| | | | | 297/250.1 |
| 10,053,173 | B1* | 8/2018 | Metz | B62J 1/08 |
| 10,455,946 | B1* | 10/2019 | Wang | A47C 7/462 |
| 2017/0327015 | A1* | 11/2017 | Siess | B60N 2/793 |
| 2019/0223606 | A1* | 7/2019 | Hesse | A47C 7/38 |
| 2019/0307251 | A1* | 10/2019 | Takagi | A47C 1/0308 |
| 2020/0198500 | A1* | 6/2020 | Woo | B60N 2/548 |

FOREIGN PATENT DOCUMENTS

| | | | | |
|---|---|---|---|---|
| DE | 102008050953 | A1 | | 4/2010 |
| ES | 2157738 | A1 | | 8/2001 |
| FR | 2882306 | A1 | | 8/2006 |
| JP | 54055927 | A | * 5/1979 | ............ B60N 2/919 |
| JP | H0970332 | A | | 3/1997 |
| WO | WO-0043238 | A2 | * 7/2000 | ............ B60N 2/919 |

OTHER PUBLICATIONS

Chinese Examination Report for Chinese App. No. 202010460116.9 dated Mar. 2, 2022, 15 pages.

* cited by examiner

ARMREST ASSEMBLY FOR VEHICLE SEAT

PRIORITY CLAIM

This application claims priority to French Application No. FR 19 05604, filed May 27, 2019, which is expressly incorporated by reference herein.

BACKGROUND

The present disclosure relates to an armrest assembly for a vehicle seat, and in particular an armrest assembly comprising an armrest locking device.

SUMMARY

According to the present disclosure, an armrest assembly for a vehicle seat comprises an armrest, a support, and an intermediate portion. The armrest is movable in translation along a vertical direction relative to the support.

In illustrative embodiments, the armrest assembly further comprises an armrest locking device comprising: a first part having toothed elements, and a second part capable of coming into contact with the toothed elements of the first part.

In illustrative embodiments, the second part is movable between a locking position in which the second part is in contact with the toothed elements of the first part and an unlocking position allowing movement in translation along the vertical direction of the armrest.

In illustrative embodiments, the first part is mounted on the support and the second part is mounted on the intermediate portion.

In illustrative embodiments, the second part is movable in rotation about an axis of rotation perpendicular to the vertical direction and is movable in translation along the vertical direction relative to the first part.

In illustrative embodiments, the armrest assembly further comprises a control device, the control device comprising a slider for locking or unlocking the second part, the slider being arranged on the intermediate part and being movable in translation along the intermediate part.

In illustrative embodiments, the second part is in continual contact with the toothed elements of the first part, the second part being in the locking position or in the unlocking position.

According to a variant, the locking device is able to transition from the locking position to the unlocking position in response to a breaking force applied to the armrest.

In illustrative embodiments, the second part is a cogwheel.

In illustrative embodiments, the slider of the control device may comprise a comb, the comb being able to engage with the second part in order to lock said second part.

In illustrative embodiments, the second part is a rigid wire.

In illustrative embodiments, the slider may comprise a guide for the rotation of the second part about the axis of rotation, the guide being in contact with the second part.

In illustrative embodiments, a vehicle seat is provided comprising at least a seating portion and an armrest assembly as described above, the support being integral with the seating portion Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
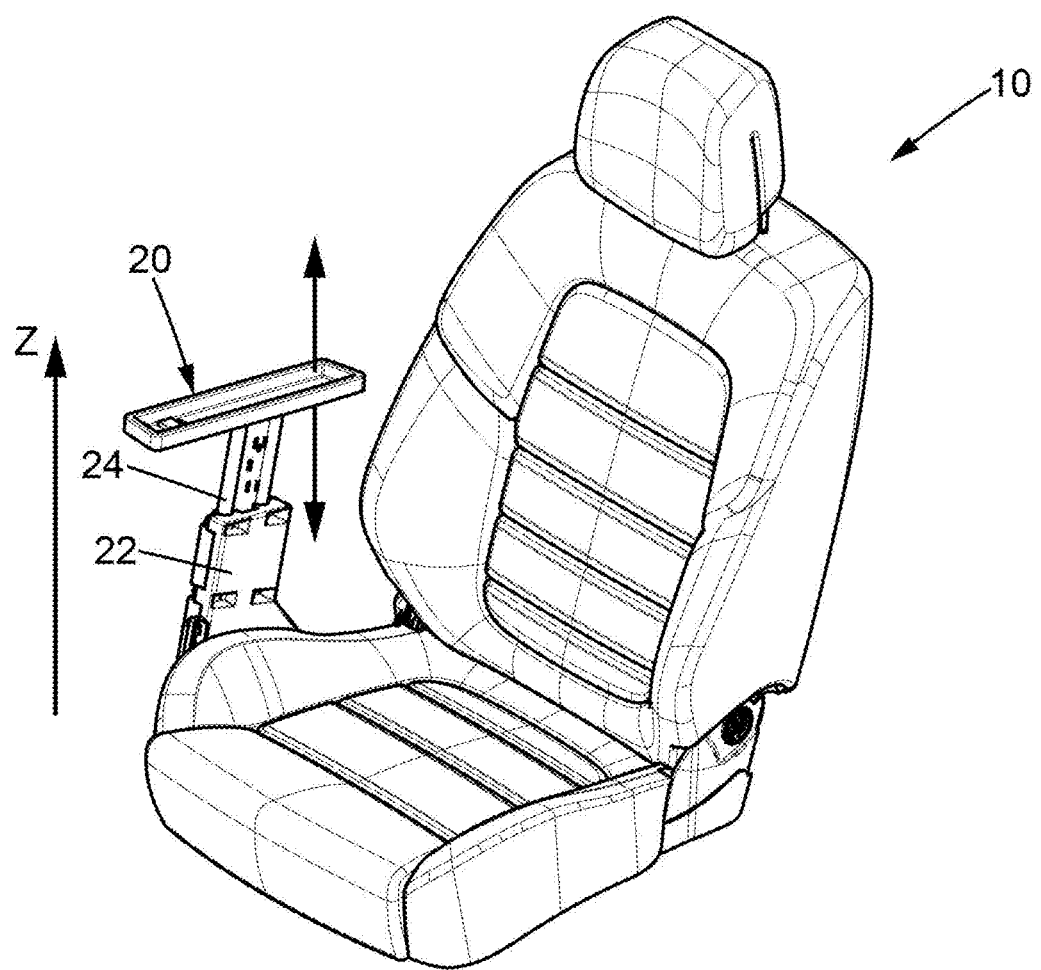
FIG. 1 shows an example of an armrest assembly.

FIG. 1 illustrates the armrest assembly of the present disclosure. The armrest assembly makes it possible to move in the vertical direction Z, in other words in the up-down direction in normal operation of a vehicle, a member 20 forming part of a vehicle seat. The member 20 can move in translation along the vertical direction Z. The member 20 may for example be an armrest, as illustrated in the figures, and more precisely an armrest of a seat 10. Alternatively, the member 20 may be a central armrest, a headrest, a tray table, or any other member that may require height adjustment.

Figure 2:
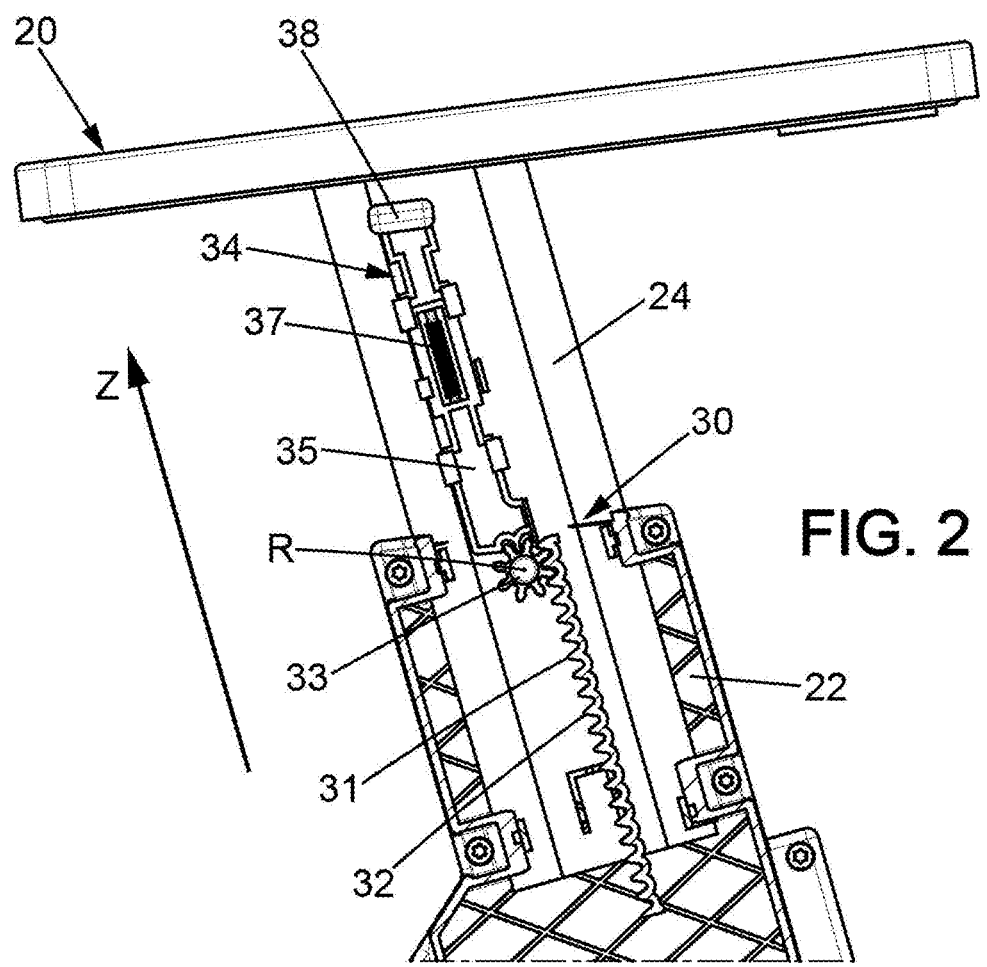
FIG. 2 shows the armrest assembly according to a first exemplary embodiment.
Figure 3:
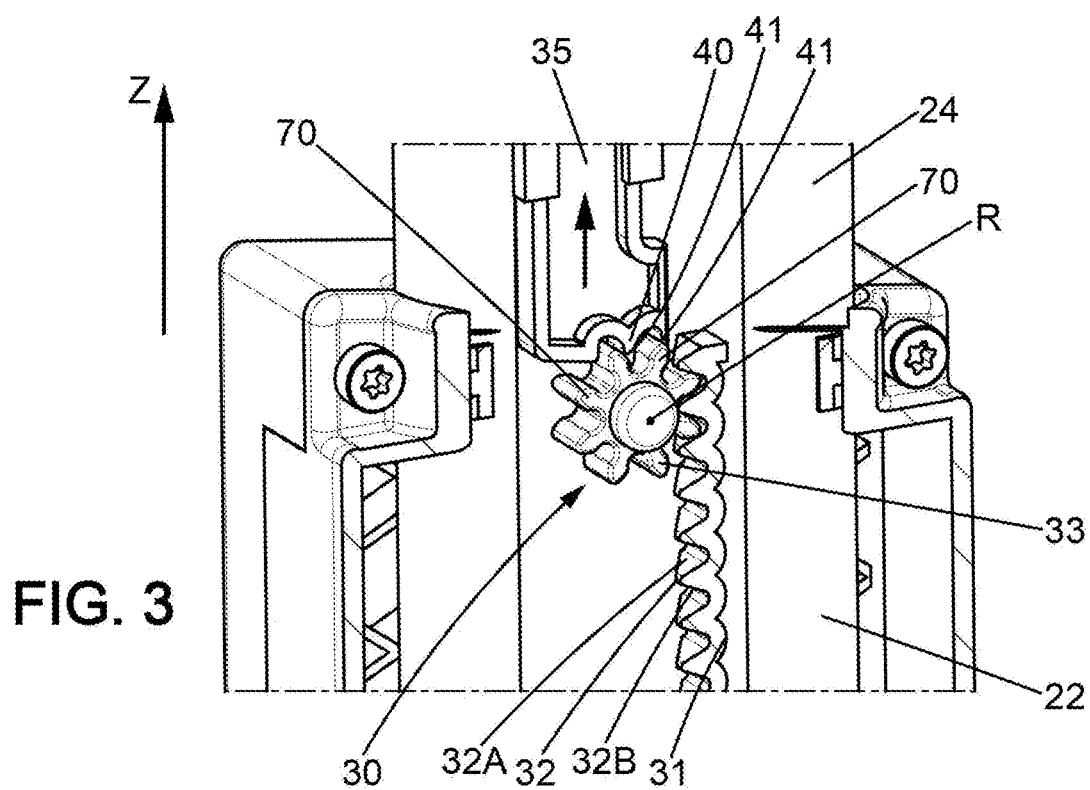
FIG. 3 shows the locking device of the armrest assembly according to the first example of FIG. 2, the device being in the locked position.
Figure 4:
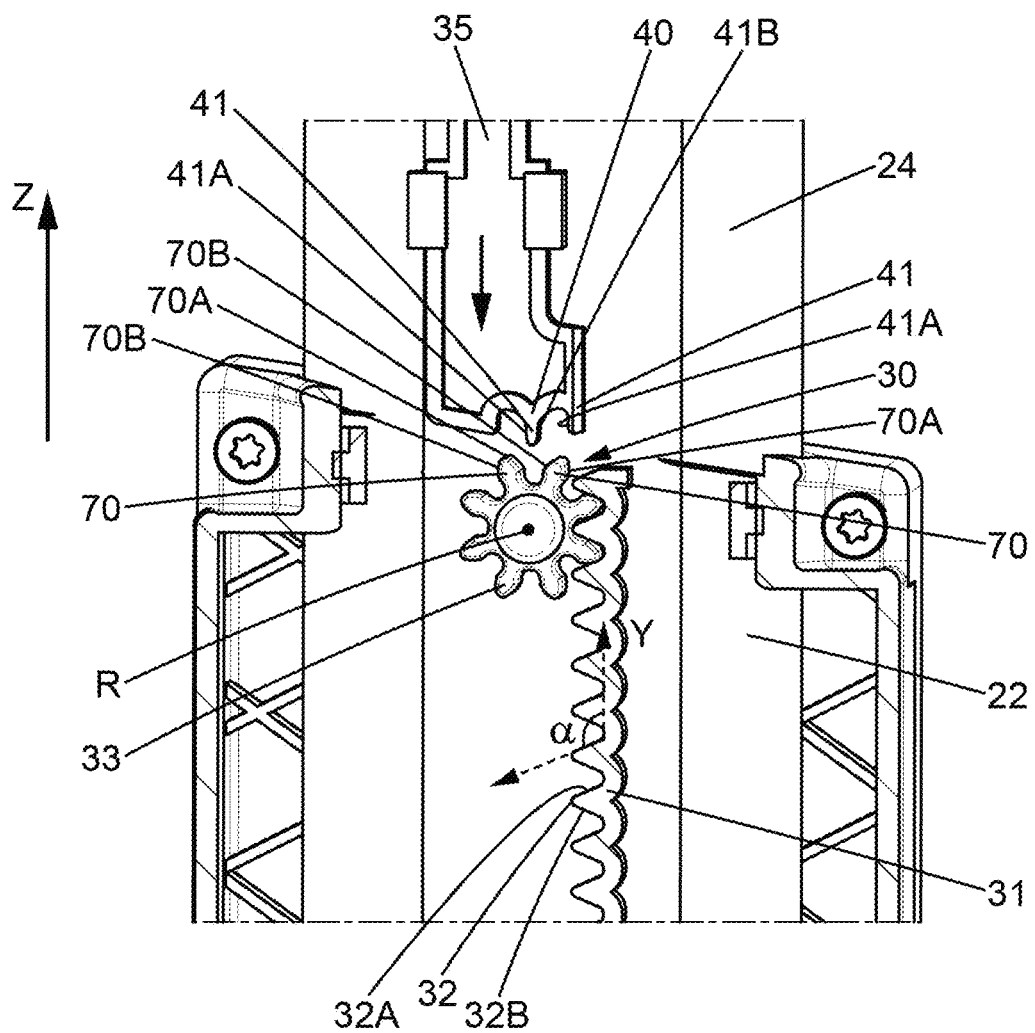
FIG. 4 shows the locking device of the armrest assembly according to the first example of FIG. 2, the device being in the unlocked position.
Figure 5:
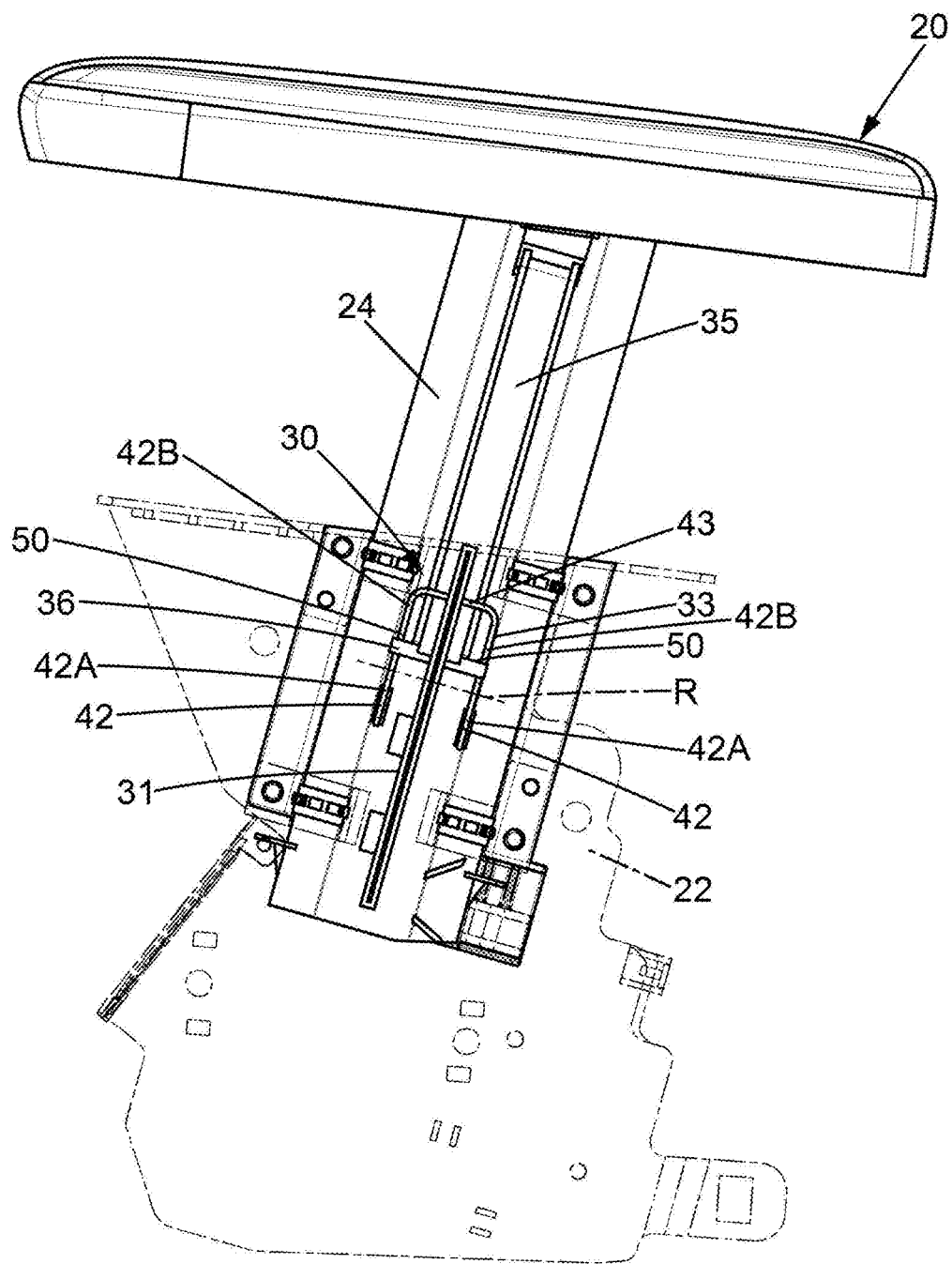
FIG. 5 shows the locking device of the armrest assembly according to a second exemplary embodiment.
Figure 6:
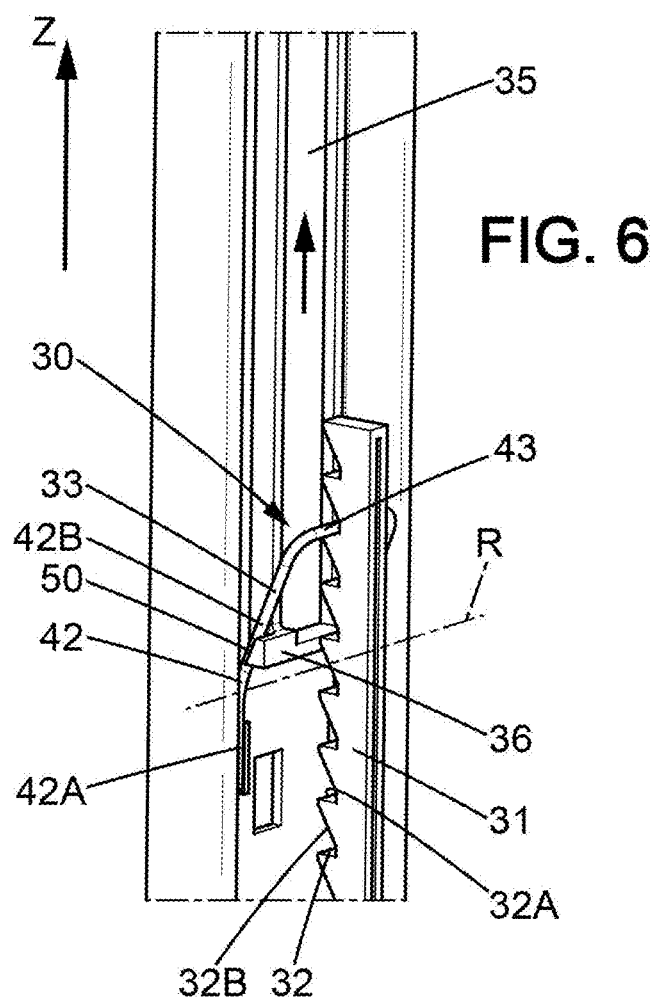
FIG. 6 shows the locking device of the armrest assembly of the second example in a perspective view.
Figure 7:
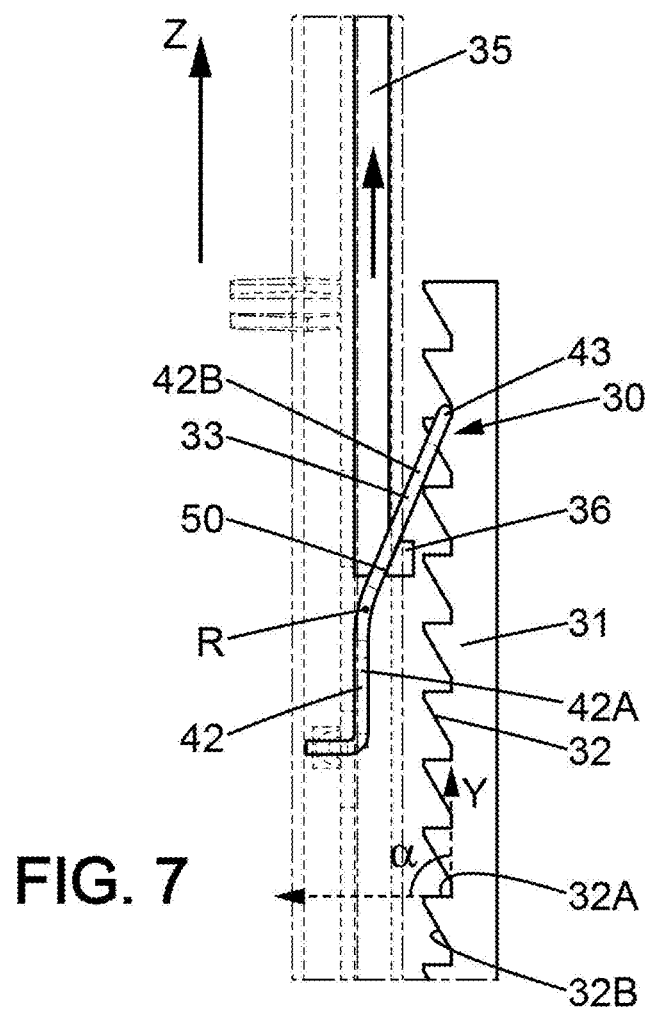
FIG. 7 shows the locking device of the armrest assembly of the second example, in another view.

The present description refers in particular to two exemplary embodiments, the first being illustrated in FIGS. 2 to 4 and the second being illustrated in FIGS. 5 to 7. These two exemplary embodiments have common elements, described below.

FIGS. 2 and 5, in particular, illustrate the armrest assembly in detail. The assembly comprises a support 22 and an intermediate portion 24. The support 22 is fixed relative to the seat 10, and is for example integral with the seating portion of a seat. The intermediate portion 24 is movable in translation along the vertical direction Z. The intermediate portion 24 is connected to the armrest 20 and thus enables the movement in translation of the armrest 20. In other words, the height of the armrest can be adjusted so that a user is comfortable. More specifically, the intermediate portion 24 slides in the support 22, due to the complementary shapes of the support 22 and the intermediate portion 24.

The armrest assembly further comprises a locking device 30. The locking device 30 is illustrated in FIGS. 2 to 7. The locking device 30 makes it possible to hold the armrest 20 at a predefined height. The locking device 30 also makes it possible to change the desired height of the armrest 20. More generally, the locking device 30 allows adjusting the height of the armrest 20, and consequently its movement along the vertical direction Z. The locking device 30 comprises a first part 31 and a second part 33. The first part 31 has toothed elements 32. The first part 31 is also of substantially longitudinal shape, the toothed elements 32 being distributed laterally along the entire length of the first part 31. In other words, the first part 31 is comparable to a rack of a rack-and-pinion arrangement. The second part 33 is movable between a locking position and an unlocking position. According to one exemplary embodiment, the second part 33 is in continual contact with the toothed elements 32 of the first part 31. In other words, the second part 33 is in contact with the first part 31, in the locking position of the armrest 20 as well as in the unlocking position. In addition, the second part 33 is rotatable about an axis of rotation R. The axis of rotation R is perpendicular to the vertical direction Z. In the examples illustrated in the figures, the axis of rotation R is also perpendicular to the longitudinal direction in which the armrest 20 extends.

According to one exemplary embodiment, illustrated in the figures, the first part 31 is mounted on the support 22 and the second part 33 is mounted on the intermediate portion 24. Conversely, according to another exemplary embodiment, not illustrated, the first part 31 is mounted on the intermediate portion 24 and the second part 33 is mounted on the support 22.

The locking device further comprises a control device 34. The control device 34 is mounted on the intermediate portion 24. The control device 34 makes it possible to lock or unlock the second part 33. More particularly, the control device 34 has a slider 35, a return means 37, and a gripping member 38. The control device 34 is accessible to the user via the gripping member 38, in order to adjust the height of the armrest 20. The gripping member 38 may for example be a lever or a trigger that the user can grasp with his or her fingers while resting the palm of his or her hand on the armrest 20. When the user grasps the gripping member 38, the user actuates the slider 35 which unlocks the second part 33. While grasping the gripping member 38, the user can then adjust the armrest 20 to the desired height. Then, once the desired height has been obtained, the user releases the gripping member 38 which locks the second part 33. In particular, the slider 35 is movable in translation, along the part on which it is mounted, between a locking position and an unlocking position of the armrest 20. As illustrated for example in FIG. 2 or in FIG. 5, the slider 35 is mounted on the intermediate portion 24. As a result, the slider 35 is movable in translation along the vertical direction Z, independently of the translation of the second part 24 along the same vertical direction Z. The upward or downward translation of the slider 35 along the vertical direction Z is possible due to the user who is grasping the gripping member 38. When the user releases the gripping member 38, the slider 35, under the action of the return means 37 which is for example a return spring or an elastic part, returns to the locking position. In other words, the slider 35 is in the locking position by default.

In addition, the toothed elements 32 of the first part 31 comprise a contact surface 32A and an opposite surface 32B, visible in FIGS. 3, 4, 6 and 7. The contact surface 32A is intended to be in contact with the second part 33. As illustrated for example in FIGS. 4 and 7, the first part 31 extends along a longitudinal axis Y. The contact surface 32A forms an angle of inclination a with this longitudinal axis Y. The angle of inclination a is a directional angle, meaning it is measured from the longitudinal axis Y towards the contact surface 32A. The angle of inclination a can vary as a function of the desired breaking force (detailed further below in the description). For example, the angle of inclination a may be between about 80° and about 160°. According to another example, the angle of inclination a may be between about 90° and about 135°, and preferably about 110°.

The elements common to the two exemplary embodiments illustrated by the figures have been described above.

A first exemplary embodiment is now described, with reference to FIGS. 2 to 4. In particular, only the elements specific to this first exemplary embodiment will be described in what follows, the features detailed above not being repeated in the following description.

FIG. 3 illustrates the locking position of the armrest 20, and FIG. 4 illustrates the unlocking position of the armrest 20. In this first embodiment, the second part 33 is a cogwheel comprising teeth 70. The teeth 70 of the cogwheel each comprise a leading edge 70A and a trailing edge 70B. The teeth 70 mesh with the toothed elements 32 of the first part 31. In particular, the second part 33 is mounted on the intermediate portion 24.

In addition, the slider 35 comprises a comb 40 at its end closest to the second part 33. The comb 40 comprises teeth 41 of a shape complementary to the teeth 70 of the second part 33. The teeth 41 of the comb 40 each comprise a leading edge 41A and a trailing edge 41B. Here, "complementary shape" is to be understood to mean that the teeth 41 are able to mesh with the teeth of the cogwheel 33. However, as the profile of the teeth 70 of the cogwheel 33 is different from the profile of the teeth 41 of the comb 40, when the comb 40 is engaged with the cogwheel 33 some play remains between the teeth 41 of the comb 40 and the teeth 70 of the cogwheel.

When the slider 35 is in the locking position, in other words the return means 37 are holding the slider 35 down, the comb 40 is engaged with the second part 33. In this position, the second part 33 is immobilized. In other words, it is impossible for the second part 33 to pivot about its axis of rotation R. When the slider 35 is in the unlocking position, meaning that the user is pulling on the gripping member 38, the comb 40 and the second part 33 are not in contact with each other. In this case, the second part 33 is free to rotate about the axis of rotation R. Due to the rotation of the second part 33, the intermediate portion 24 can move transversely, which causes the second part 33 to move along the toothed elements 32 of the first part 31. In this configuration, it is possible to keep the assembly in the locking position, due to the contact between the comb 40 of the slider and the teeth 70 of the second part 33, the slider 35 and the second part 33 both being mounted on the intermediate portion 24, and due to the contact with the teeth 70 of the second part 33 and the toothed elements 32 of the first part 31, the first part 31 being mounted on the first part 22.

Furthermore, still in this exemplary embodiment illustrated in FIGS. 2 to 4, the teeth 41 of the comb 40 and the teeth 70 of the cogwheel 33 are configured so as to allow the locking device to resist beyond a predetermined force, hereinafter called the "breaking force". More specifically, the locking device is designed not to break when unusual force is applied to the armrest 20. For example, when a user presses too strongly on the armrest 20 (for example by exerting a firm pressure on the armrest 20 of about 400N), the locking device does not resist the breaking force applied. In this case, in response to a breaking force being applied to the armrest, the locking device is able to change from the locking position to the unlocking position. This feature is particularly advantageous because if the locking device were designed to resist the applied force, the component mechanism could break in response to this force. The result would be a broken locking device. By not resisting the applied breaking force, the locking device causes the armrest 20 to move downwards. The locking device therefore is designed not to break in response to an excessive force applied to the armrest 20. The remaining play between the teeth 41 of the comb 40 and the teeth 70 of the cogwheel when the comb 40 is engaged with the cogwheel 33 makes it possible not to resist this breaking force and to unlock the locking device. More precisely, when the user presses on the armrest while the slider 35 is in the locking position, one of the right or left edges 41A or 41B of one or more teeth 41 of the comb 40 presses respectively against one of the right or left edges 70A or 70B of one or more teeth 70 of the cogwheel 33. By this pressure, the cogwheel 33 is rotated about its axis of rotation R, a rotation which itself causes a vertical movement along direction Z (upward movement) of the slider 35. The slider 35 is then found in the unlocking position, which causes the armrest 20 to descend. Under the action of firm pressure on the armrest 20, the armrest is thus pushed down.

Furthermore, in this example, the angle of inclination a is chosen according to the desired breaking force. The angle of inclination a may be between about 90° and about 135°, and preferably about 110°.

A second exemplary embodiment is now described, with reference to FIGS. 5 to 7. Only the elements specific to this second exemplary embodiment will be described in what follows, the features common to all the exemplary embodiments detailed above not being repeated in the following description.

According to the second embodiment, the second part 33 is a wire. The wire is for example made of metal, rigid enough to retain its initial shape and not to yield under the action of normal force during use. As shown for example in FIG. 5, the wire is U-shaped, and includes two arms 42 fixed on the intermediate portion 24 and a transverse bar 43 connecting the two arms. Each of the two arms 42 comprises a portion 42A that is fixed relative to the second part 24 and a movable portion 42B. The fixed portion 42A is fixed to the intermediate portion 24 for example by interlocking (or snap-fitting) or by gluing. The movable portion 42B pivots about the axis of rotation R. As can be seen for example in FIG. 7, the axis of rotation R is transverse and common to each of the arms 42, and parallel to the transverse bar 43. The axis of rotation R separates each of the arms 42 into the fixed portion 42A and the movable portion 42B. The transverse bar 43 is in contact with the toothed elements 32 of the first part 31. In other words, the second part 33 comes to catch on the first part 31.

In addition, the slider 35 comprises a guide 36, at its end closest to the second part 33. The guide 36 extends in a direction generally perpendicular to the rest of the slider 35. The guide 36 thus forms with the slider 35 an inverted T shape. The guide 36 comprises, on each side of the slider 35, a surface 50 that is inclined with respect to the vertical direction of movement Z. The surface 50 of the guide 36 engages with the arms 42. More specifically, the arms 42 rest on the surface 50. When the slider 35 is in the locking position, in other words the return means 37 is holding the slider 35 downwards, the second part 33 is resting on the guide 36. In this position, the second part 33 is immobilized. In other words, it is impossible for the second part 33 to pivot about its axis of rotation R. When the slider 35 is in the unlocking position, in other words the user is pulling on the gripping member 38, the guide 36 moves along the arms 42, and more precisely along the movable portion 42B, which forces the second part 33 to pivot about its axis of rotation R. During the rotation of the second part 33, the transverse bar 43 disengages from the toothed elements 32. When the user releases the gripping member 38, the slider 35 returns to the locking position. More specifically, the transverse bar 43 reengages with the toothed elements 32. The reengaging of the transverse bar 43 with the toothed elements 32 can occur at a location different from the location where the transverse bar 43 was engaged with the toothed elements prior to disengagement, the engagement position being defined by the upward or downward movement of the armrest 20 and therefore by the displacement of the transverse bar 43 along the first part 31.

In this configuration, maintaining the assembly in the locking position is possible due to the contact between the guide 36 of the slider 35 and the arms 42 of the second part 33, the slider 35 and the second part 33 both being mounted on the intermediate portion 24, and due to the contact with the transverse bar 43, of the second part 33 and the toothed elements 32 of the first part 31, the first part 31 being mounted on the support 22. Furthermore, in this example, the angle of inclination a is chosen as a function of the desired breaking force. A significant force applied to the armrest causes disengagement of the transverse bar 43 initially engaged with the toothed elements 32. The angle of inclination a may be between about 90° and about 135°, and is preferably about 110°.

Furthermore, the (directional) angle between the contact surface 32A and the opposite surface 32B is greater than about 45°, in order to allow upward adjustment of the armrest 20 without unlocking the assembly. In this case, it is not necessary to grasp the gripping member 38 in order to raise the armrest 20, which makes the armrest adjustment easier for the end user.

Vehicle seats may comprise an armrest, in particular motor vehicle seats. The armrest is configured to be moved in translation relative to a portion of the seat, and in particular in height relative to the seat.

This allows, for example, the occupant to fold the armrest into different positions in order to benefit from support for his or her arm.

Comparative devices comprise a fixed portion and a portion that is movable in translation relative to the fixed portion, which allows adjusting the height of the armrest. However, the comparative devices are not entirely satisfactory. They often require a large number of parts in order to obtain a device enabling a heightwise translation of the armrest. In addition, the comparative devices lack robustness in the event of inappropriate use, for example when excessive force is applied to the armrest.

The invention claimed is:

1. An armrest assembly for a vehicle seat, the armrest assembly comprising
   an armrest,
   a support, and
   an intermediate part,
   the armrest being movable in translation along a vertical direction relative to the support, the assembly further comprising:
   a locking device for the armrest, comprising a first part having toothed elements and a second part capable of coming into contact with the toothed elements of the first part, the second part being a cogwheel with teeth; and
   a control device, the control device comprising a slider for locking or unlocking the second part, the slider being arranged on the intermediate part and being movable in translation along the intermediate part, between a locking position and an unlocking position allowing movement of the second part in translation along the vertical direction of the armrest, the second part being in continual contact with the toothed elements of the first part, whether in the locking position or in the unlocking position, the slider comprises a comb with teeth including at least a first tooth and a second tooth, the comb being able to engage with the second part in order to lock said second part in the locking position;

wherein the comb has a first lateral side and a second lateral side, the first lateral side being close to the first part and the second lateral side being distant to the first part, the first lateral side having the first tooth with a length smaller than a length of the second tooth, and wherein the teeth of the comb comprise a first profile and the teeth of the second part comprise a second profile which is different from the first profile so that a clearance remains between the teeth of the second part and the teeth of the comb when the comb is engaged with the second part, wherein the clearance and the length of the first tooth are configured to allow the locking device to transition from the locking position to the unlocking position in response to a breaking force applied to the armrest.

2. The armrest assembly of claim 1, wherein the first part is mounted on the support and the second part is mounted on the intermediate part.

3. The armrest assembly of claim 1, wherein the second part is movable in rotation about an axis of rotation perpendicular to the vertical direction and is movable in translation along the vertical direction relative to the first part.

4. The armrest assembly of claim 1, wherein the second part is in continual contact with the teeth of the first part when the second part is in the locking position or in the unlocking position.

5. A vehicle seat comprising
at least a seating portion and
an armrest assembly for a vehicle seat,
the armrest assembly comprising an armrest, a support, and an intermediate part, the armrest being movable in translation along a vertical direction relative to the support,
the armrest assembly further comprising:
a locking device for the armrest, comprising a first part having toothed elements and a second part having teeth capable of coming into contact with the toothed elements of the first part; and
a control device, the control device comprising a slider for locking or unlocking the second part, the slider being arranged on the intermediate part and being movable in translation along the intermediate part;
wherein the slider is movable between a locking position and an unlocking position allowing movement of the second part in translation along the vertical direction of the armrest, the slider comprising teeth including a first tooth and a second tooth that engage the teeth of the second part in the locking position and at least partially disengage the teeth of the second part in the unlocking position;
wherein the first tooth has a length smaller than a length of the second tooth wherein the teeth of the slider comprise a first profile and the teeth of the second part comprise a second profile which is different from the first profile so that a clearance remains between the teeth of the second part and the teeth of the slider when the slider is engaged with the second part, wherein the clearance and the length of the first tooth are configured to allow the locking device to transition from the locking position to the unlocking position in response to a breaking force applied to the armrest.

6. The vehicle seat of claim 5, wherein the second part is in continual contact with the toothed elements of the first part when the second part is in the locking position or in the unlocking position.

7. The vehicle seat of claim 5, wherein the support is integral with the seating portion.

8. The vehicle seat of claim 5, wherein the first part is mounted on the support and the second part is mounted on the intermediate part.

9. The vehicle seat of claim 5, wherein the second part is movable in rotation about an axis of rotation perpendicular to the vertical direction and is movable in translation along the vertical direction relative to the first part.

10. An armrest assembly for a vehicle seat, the armrest assembly comprising
an armrest,
a support, and
an intermediate part,
the armrest being movable in translation along a vertical direction relative to the support, the assembly further comprising:
a locking device for the armrest, comprising a first part having toothed elements and a second part capable of coming into contact with the toothed elements of the first part, the second part being a cogwheel with teeth, and
a control device, the control device comprising a slider for locking or unlocking the second part, the slider being arranged on the intermediate part and being movable in translation along the intermediate part, between a locking position and an unlocking position allowing movement of the second part in translation along the vertical direction of the armrest, the second part being in continual contact with the toothed elements of the first part, whether in the locking position or in the unlocking position,
wherein the slider comprises a comb with at least a first tooth and a second tooth, the comb being able to engage with the second part in order to lock said second part in the locking position, and
wherein the comb has a first lateral side and a second lateral side, the first lateral side being close to the first part and the second lateral side being distant to the first part, the first lateral side having the first tooth with a length smaller than a length of the second tooth, wherein the teeth of the comb comprise a first profile and the teeth of the second part comprise a second profile which is different from the first profile so that a clearance remains between the teeth of the second part and the teeth of the comb when the comb is engaged with the second part, wherein the clearance and the length of the first tooth are configured to allow the locking device to transition from the locking position to the unlocking position in response to a breaking force applied to the armrest.

11. The armrest assembly of claim 10, wherein the first part is mounted on the support and the second part is mounted on the intermediate part.

12. The armrest assembly of claim 10, wherein the second part is movable in rotation about an axis of rotation perpendicular to the vertical direction and is movable in translation along the vertical direction relative to the first part.

* * * * *